(12) United States Patent
Nagavamsi et al.

(10) Patent No.: US 6,631,366 B1
(45) Date of Patent: Oct. 7, 2003

(54) DATABASE SYSTEM PROVIDING METHODOLOGY FOR OPTIMIZING LATCHING/COPYING COSTS IN INDEX SCANS ON DATA-ONLY LOCKED TABLES

(75) Inventors: Ponnekanti Nagavamsi, Emeryville, CA (US); Jameison B. Martin, Oakland, CA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/421,783

(22) Filed: Oct. 19, 1999

Related U.S. Application Data

(60) Provisional application No. 60/105,034, filed on Oct. 20, 1998.

(51) Int. Cl.[7] ............................................. G06F 17/00
(52) U.S. Cl. ............................ 707/3; 707/4; 707/102
(58) Field of Search ............................. 707/1–10, 100, 707/101, 102, 104

(56) References Cited

U.S. PATENT DOCUMENTS

| | | | |
|---|---|---|---|
| 4,606,002 A | | 8/1986 | Waisman et al. |
| 4,677,550 A | | 6/1987 | Ferguson |
| 4,791,561 A | | 12/1988 | Huber |
| 4,805,099 A | | 2/1989 | Huber |
| 4,829,427 A | * | 5/1989 | Green ............................ 707/2 |
| 4,947,320 A | | 8/1990 | Crus et al. |
| 5,089,952 A | | 2/1992 | Bozman |
| 5,115,392 A | | 5/1992 | Takamoto et al. |
| 5,123,104 A | | 6/1992 | Levine et al. |
| 5,163,148 A | | 11/1992 | Walls |
| 5,204,958 A | | 4/1993 | Cheng et al. |
| 5,265,244 A | | 11/1993 | Ghosh et al. |
| 5,430,869 A | | 7/1995 | Ishak et al. |
| 5,455,944 A | * | 10/1995 | Haderle et al. .............. 707/202 |
| 5,493,728 A | | 2/1996 | Solton et al. |
| 5,504,888 A | | 4/1996 | Iwamoto et al. |
| 5,555,389 A | | 9/1996 | Satoh et al. |
| 5,581,765 A | | 12/1996 | Munroe et al. |
| 5,717,919 A | * | 2/1998 | Kodavalla et al. .............. 707/8 |
| 5,721,915 A | * | 2/1998 | Sockut et al. ................ 707/201 |
| 5,745,756 A | * | 4/1998 | Henley ........................ 707/204 |
| 5,758,356 A | * | 5/1998 | Hara et al. ...................... 707/2 |
| 5,778,353 A | * | 7/1998 | Schiefer et al. ................. 707/2 |
| 5,826,253 A | * | 10/1998 | Bredenberg .................... 707/2 |
| 5,832,484 A | * | 11/1998 | Sankaran et al. ............... 707/8 |
| 5,842,196 A | * | 11/1998 | Agarwal et al. ................ 707/2 |
| 5,918,224 A | | 6/1999 | Bredenberg .................... 707/2 |
| 6,003,022 A | * | 12/1999 | Eberhard et al. ............... 707/2 |
| 6,009,425 A | * | 12/1999 | Mohan ........................... 707/8 |
| 6,026,412 A | * | 2/2000 | Sockut et al. ................ 707/200 |
| 6,341,288 B1 | * | 1/2002 | Yach et al. ............. 707/103 R |
| 6,411,964 B1 | * | 6/2002 | Iyer et al. .................... 707/200 |

OTHER PUBLICATIONS

"Algorithms for Creating Indexes for Very Large tables Without Quiescing Updates"—C. Mohan and Inderpal Narang; 1992 AC SIGMOD 1992 ACM 0-89791-522-4/92/0005/0361; pp. 361–370.*

"Pseudo Column Level Locking"—Nagavamsi Ponnekanti, Data Engineering, 2001. Proceedings, 17th. Apr., 2–6, 2001, Heidelberg Germany; 2001 IEEE, pp: 545–550.*

* cited by examiner

*Primary Examiner*—Hosain T. Alam
(74) *Attorney, Agent, or Firm*—John A. Smart

(57) ABSTRACT

A database system is described that provides a methodology for significantly reducing latching costs associated with index pages in non-covered index scans, all without the need for using a conventional "shadow page." The database system uses a "look ahead" list (LA) to save up to a preset number (e.g., 60) of ROWIDs (row identifiers) from the qualifying index keys. Since a ROWID is typically small (e.g., about 6 bytes), the space needed to store 60 ROWIDs is typically much smaller than the underlying page size (which typically range from 2K to 32K in systems). Thus, instead of finding just one next qualifying key as is conventionally done, up to a selected number (e.g., 60) of qualifying keys on the current page are found and the ROWIDs from them are stored in the look ahead list. In many cases, the copying costs are eliminated too. In this manner, the system may avoid the substantial copying/latching overhead typically incurred for large scans for which several rows may be of interest.

28 Claims, 6 Drawing Sheets

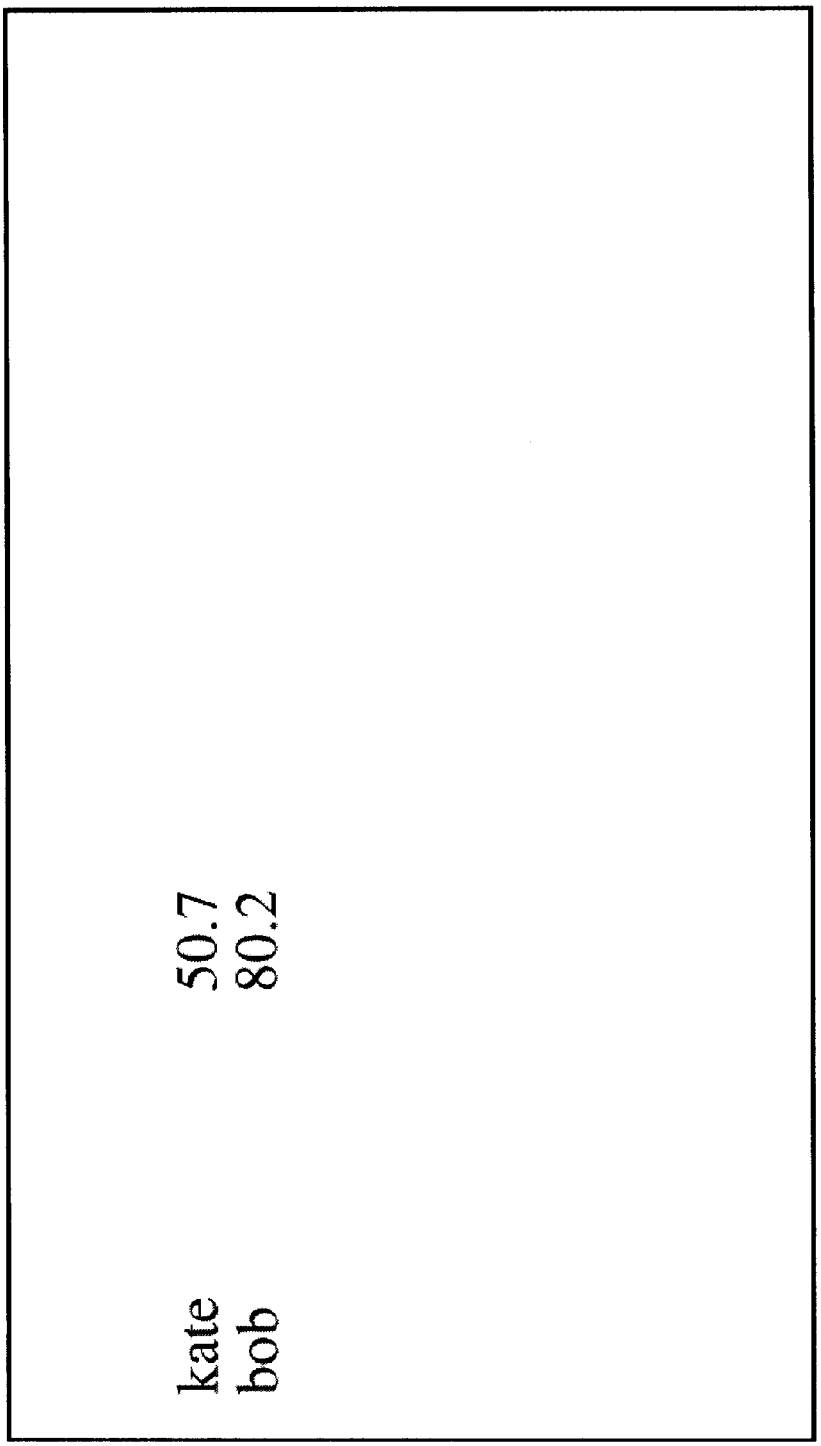

DATABASE SYSTEM PROVIDING METHODOLOGY FOR OPTIMIZING LATCHING/COPYING COSTS IN INDEX SCANS ON DATA-ONLY LOCKED TABLES

RELATED APPLICATIONS

The present application claims the benefit of priority from and is related to the following commonly-owned U.S. provisional application: application Ser. No. 60/105,034, filed Oct. 20, 1998. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to retrieval and processing of information stored in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase Adaptive Server™ database servers. Both Powersoft™ and Sybase Adaptive Server™ are available from Sybase, Inc. of Emeryville, Calif.

As the migration to client/server continues, each day more and more businesses are run from mission-critical systems which store information on server-based SQL database systems, such as Sybase Adaptive Server™. As a result, increasingly higher demands are being placed on server-based SQL database systems to provide enterprise-wide decision support. Accordingly, there is much interest in improving the performance of such system, particularly in terms of execution speed and reliability.

SUMMARY OF THE INVENTION

The present invention provides a methodology for using look ahead lists to significantly reduce latching costs associated with index pages in non-covered index scans, without the necessity of using a shadow page. (For covered queries, the datarow is not retrieved; all columns needed by the queryproc (query processing module) are provided from the index row.) In many cases, the copying costs are eliminated too.

In database systems, a "B+-tree" is a common indexing scheme that is employed. A primary B+-tree has data records at the leaf row, while a secondary B+-tree has index keys, where a key consists of a key value and a ROWID of the data record. The index manager of a database system typically provides the following interface methods to facilitate scans:

(1) startscan( ): to start a scan on an index, optionally with some search arguments (or SARGs), which are simple conditions that can be expressed in the form of column <relop> value, where relop can be <, >, <=, >=, !=or =and column is a column in the index. If the index is on 'name' column of an Employee table, name="Joe" is an example of a SARG.

(2) getnext( ): to retrieve ROWID from the next qualifying index key. This ROWID is used by the system's data layer to retrieve the data record.

(3) endscan( ): to terminate the scan and clean up resources.

A conventional approach for implementing getnext( ) would be as follows:

```
getnext ()
if (this is the first call to getnext())
{
    STEP 1A:
        current_age = call index traversal to retrieve the
                      scan start page latched
}
else
{
    STEP 1B :
    /* We already have a current_page and current_key */
    Latch current_page;
    STEP 2 :
    /* Check if page was modified by a concurrent transaction */
    if (the page has changed since latch on it was dropped)
    {
        STEP 2A:
        /* Need to restart scan */
        Unlatch current_page;
        current_page =    call index traversal to retrieve the
                          page containing current_key (or the page
                          that would have contained current_key if
                          it was present in the index) latched
    }
}
STEP 3:
/*
** Note that if no more qualifying keys exist on current_page, scan
```

-continued

```
** moves to its next page and current_page is set to its next page
*/
Find the next qualifying index key K
STEP 4:
/*
** Note that it is not acceptable to wait for a lock while holding latch.
** So in the following step, if lock cannot be acquired without waiting,
** then the scan needs to unlatch current_page and sleep on lock.
*/
Lock K if scan is required to lock qualifying keys
STEP 5:
/* Copy K */
current_key = K
STEP 6:
Unlatch current_page
STEP 7:
return ROWID from K
}
```

However, in the above approach, there is a latch/unlatch operation for every qualifying key. If there are 100 qualifying keys on a page, the latched/unlatched cycle occurs 100 times.

Some systems solve this problem by using a shadow page. In that scheme, when a page is latched, all qualifying keys are copied to shadow page. Subsequently, the rows are returned from shadow page, avoiding the latch requests on the original page. However, the shadow page is a memory overhead. The present invention, in contrast, provides a methodology that solves this problem without using a shadow page. In addition, it also saves the cost of copying qualifying keys in some cases.

The preferred approach may be summarized as follows.

(1) The database system uses a "look ahead" list (LA) to save up to a preset number (e.g., 60) of ROWIDs (row identifiers) from the qualifying index keys. Since a ROWID is typically small (e.g., about 6 bytes), the space needed to store 60 ROWIDs is typically much smaller than the underlying page size (which typically range from 2K to 32K in systems). Thus, in step 3 above, instead of finding just one next qualifying key, up to a selected number (e.g., 60) of qualifying keys on the current page are found and the ROWIDs from them are stored in the look ahead list.

(2) In addition to space needed for look ahead list, the approach uses space to store one index key.

The scan is considered to be in NOCOPY mode if it satisfies the following conditions:

1. The scan is not for a cursor statement, AND
2. The scan is required to hold a lock on its current row, AND
3. The scan is not for an update statement which is modifying one of the index columns.

Otherwise, it is considered to be in DCOPY mode.

If the scan is in NOCOPY mode, then copying every qualifying key is not needed. In such a case, STEP 5 is not needed. If a restart is needed, i.e., in STEP 2A, the index key is built from the data record which corresponds to last ROWID returned. On the other hand, if the scan is in DCOPY mode, then STEP 5 is omitted if latch is not being held on the index page. Instead, the index key is built from the data record and copied while holding the latch on data page. If the data layer finds that the data record does not qualify, then there is no need to build or copy the index key.

GLOSSARY

The following definitions are provided for purposes of illustration.

| | |
|---|---|
| Allpages Table: | A format of tables where the locking scheme employed locks both the index and data pages. The clustered index in these tables guarantee the ordering of the data rows. |
| ASE: | Sybase Adaptive Server Enterprise |
| Latch: | Latches are like short term locks. They are held only for the duration of accessing the page and can be acquired in either shared mode (readers) or exclusive mode (writers). Readers access page under a shared latch, make a copy of the row that they are interested in and release the latch. Similarly writers acquire an exclusive latch for the duration of modification of a page. Since there are no locks, some page level synchronization, such as latching, is used on index pages. |
| Isolation level: | Mechanism to control the degree to which the operations in one transaction are visible to the operations in other concurrent transactions. |
| I/O: | Refers to the Input and Output operations in a database system. |
| Logical I/O: | Refers to the I/O operation to/from the main memory. |
| Physical I/O: | Refers to the I/O operation to/from the disk. |
| RDBMS: | Relational Database Management System |
| Clustered Index: | A type of index created on RDBMS tables which tries to ensure that the data rows accessed via this index are well ordered or "clustered" together. |
| Non-Clustered Index: | A type of index created on RDBMS tables where the index does not guarantee that the data rows accessed via the index are well "clustered". |
| Query Optimizer: | The module of the RDBMS that decides on an optimal strategy for data access. |
| DataOnly Locked Tables: | DOL tables are a format of tables where the locking scheme employed lock only the data pages or the data rows. The clustered index in these tables tries to maintain ordering for data rows but do not guarantee such ordering. |
| RID: | The Record Identifier, which includes a Page Identifier (pageid) and Row Number (rownum). |

| | -continued |
|---|---|
| SARG: | Scan or search argument (i.e., condition). |
| SR: | Used for brevity to denote a scan at serializability isolation level. |
| Shadow page: | Some systems use a shadow page so that once a page is accessed, all rows of interest can be copied into a private shadow page so that the original page does not have to be latched again. Shadow buffers are a memory overhead, however. |

BRIEF DESCRIPTION OF THE DRAWINGS

FIGS. 4A–B are block diagrams illustrating shadow buffers for the ICOPY mode for both a SR (serializability isolation level) scan and a non-SR scan.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment requiring optimization of information retrieval. The description of the exemplary embodiments which follows is, therefore, for the purpose of illustration and not limitation.

Standalone System Hardware

Figure 1A:
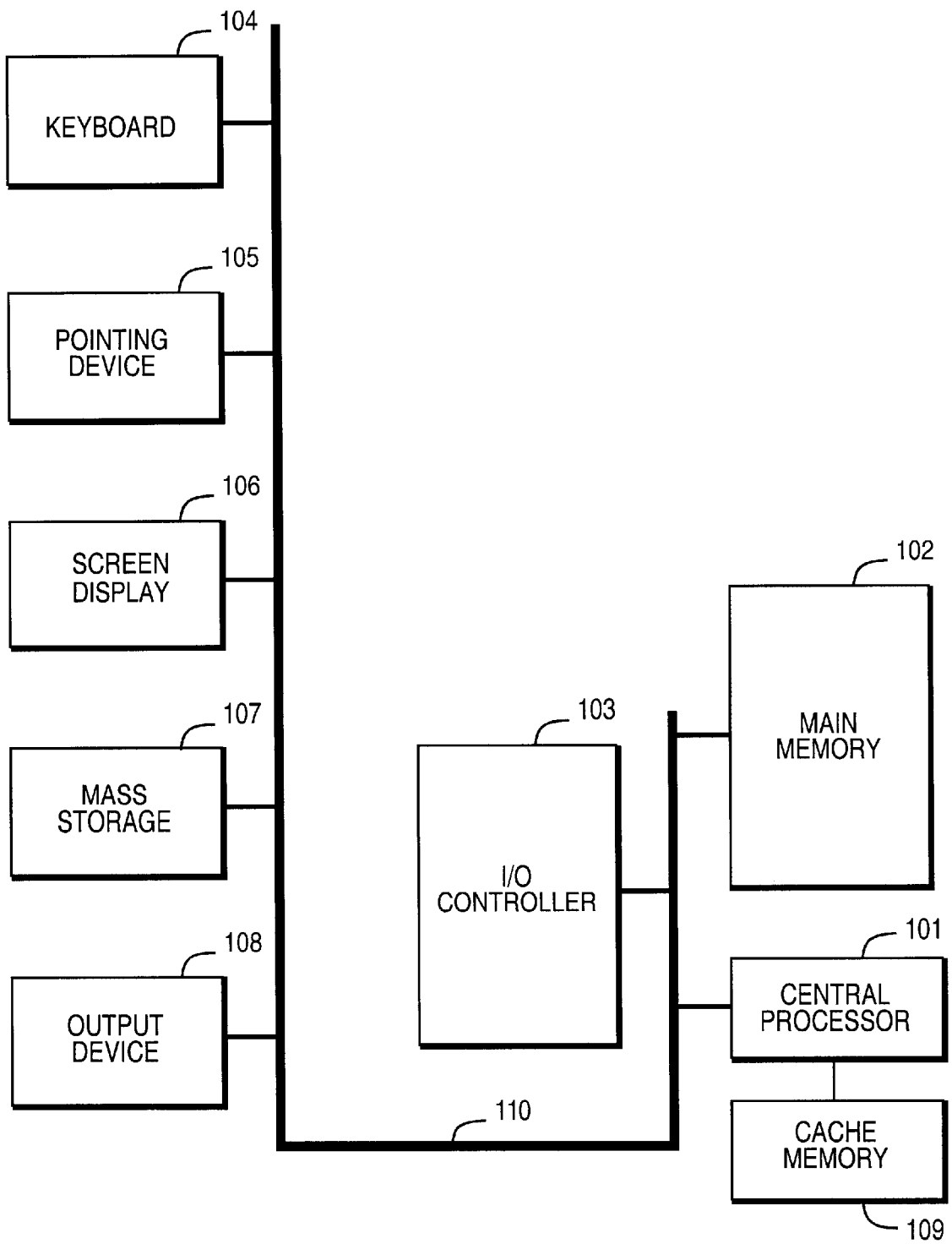
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
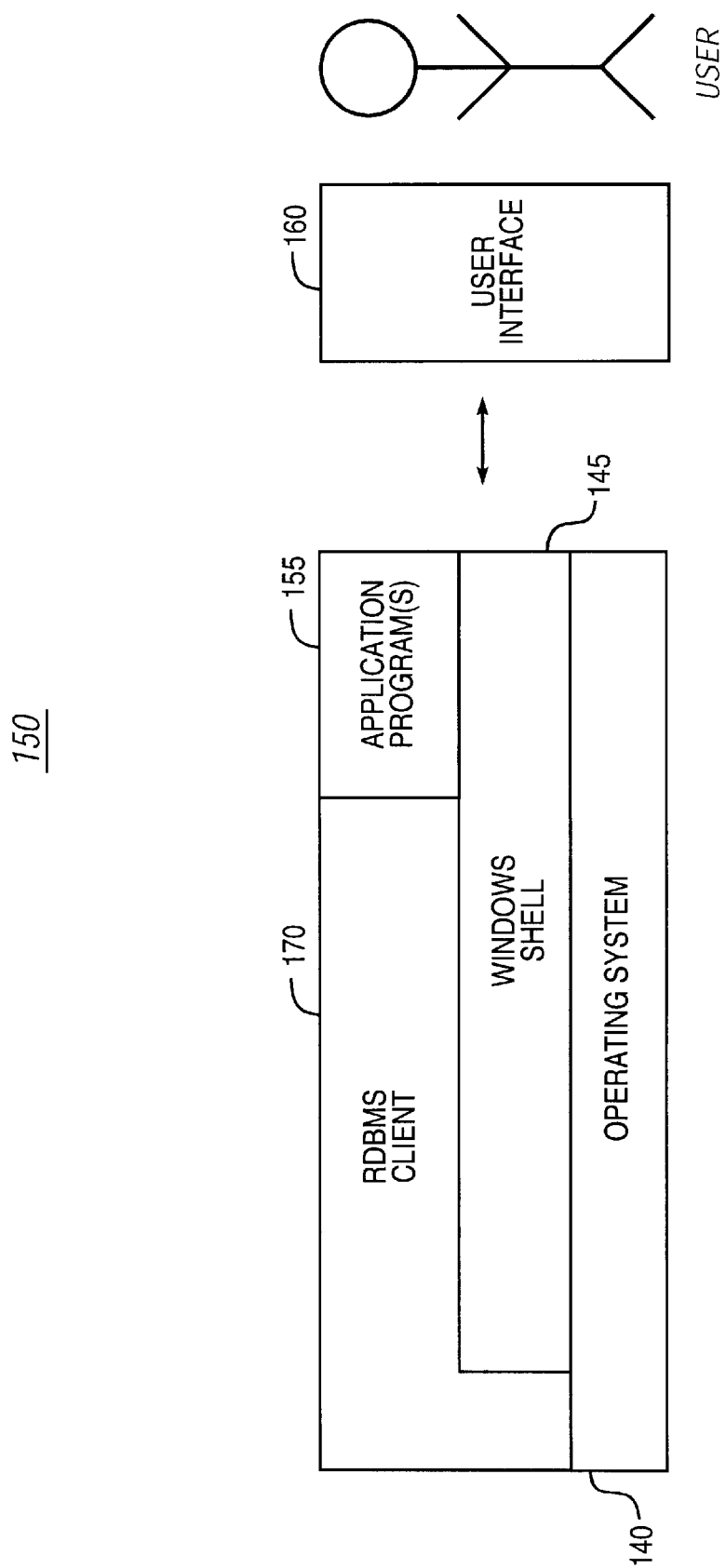
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a window-based or graphical user interface shell 145. One or more application programs, such as application software 155, may be "loaded" (i.e., transferred from storage 107 into memory 102) for execution by the system 100. The system also includes a user interface 160 for receiving user commands as input and displaying user data as output.

Also shown, the software system 150 includes a Relational Database Management System (RDBMS) front-end or client 170. The RDBMS front-end 170 may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2:
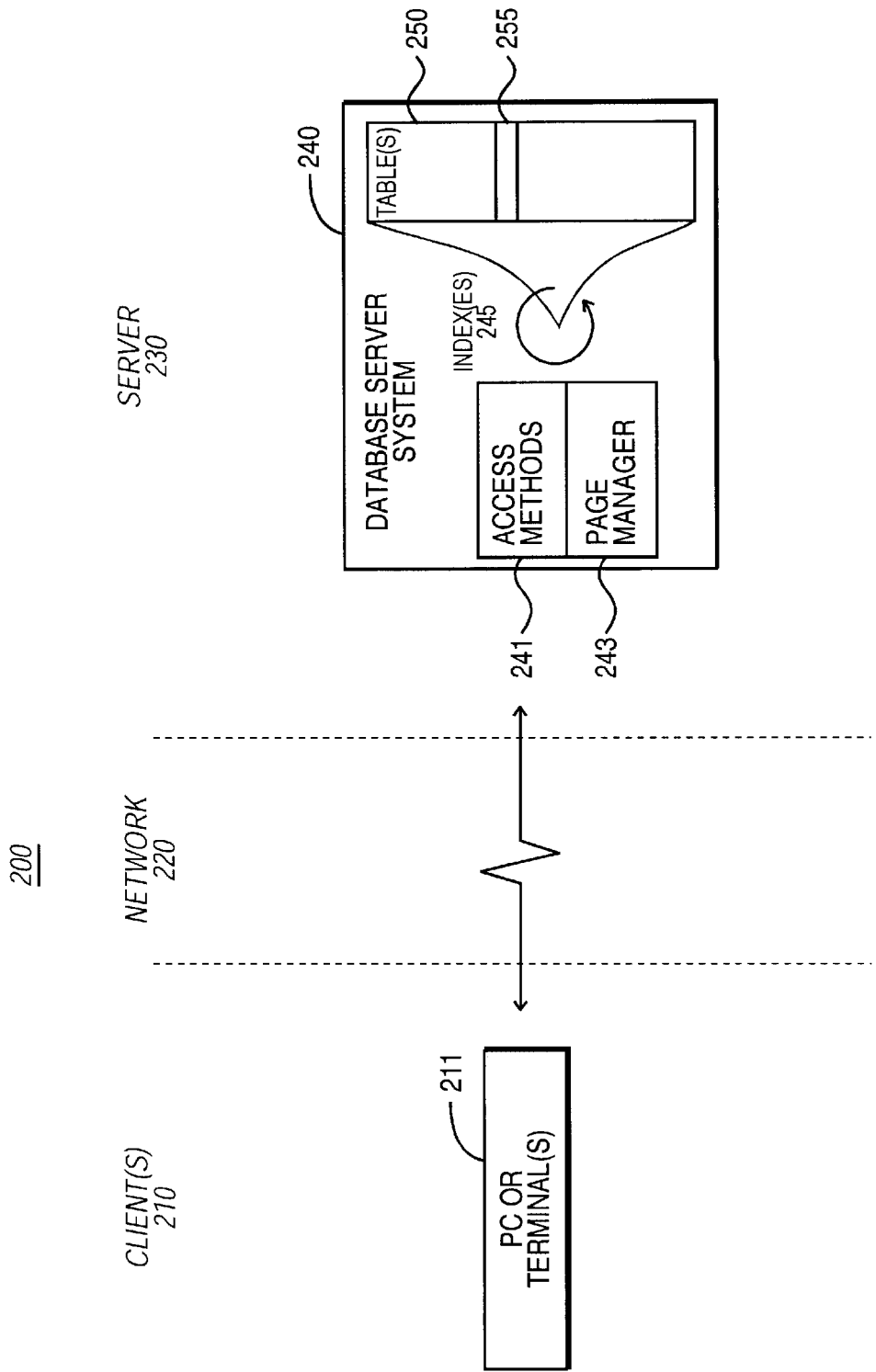
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows for PC clients.

The Database Server System 240, which comprises Sybase Adaptive Server™ (Sybase of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server*, Second Edition, Addison-Wesley Publishing Company, 1995. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or records (tuples); each record comprises columns or fields of information. A database record, therefore, includes information which is most conveniently represented as a single unit. A record for an employee, for example, may include information about the employee's ID Number, Last Name and First Initial, Position, Date Hired, Social Security Number, and Salary. Thus, a typical record includes several categories or fields of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

For enhancing the speed in which the Database Server stores, retrieves, and processes particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

As clients insert more and more data into the table 250, the index 245 continues to grow. Two parts of the Database Server System 240 play a central role in the accessing and managing tables and indexes: Access Methods 241 and Page Manager 243. For example, when a request from a client to insert a new row (i.e., record) into the table occurs in the system, the Access Methods 241 employ the index 245 for determining on which of the leaf-level pages (e.g., clustered index) a particular row should be inserted. If sufficient space exists on the particular page located, then the Access Methods do not require the assistance of the Page Manager. The row is simply inserted into the located page, at the appropriate storage space or "slot" available at that page. The process may continue in this manner until a row arrives for insertion which cannot fit on the existing page. Here, the Access Methods seek assistance from the Page Manager for allocating a new page (which is now needed, at this point, for the table). As the client continues to add more and more rows, the table continues to grow and the process repeats. This operation occurs very frequently in practically all on-line transaction processing (OLTP) systems. The following discussion focuses on modifications to the system 200, for providing improved query execution performance.

Optimizing Latching/Copying Costs in Index Scans on Data-Only Locked Tables

A. Overview

In database systems, a "B+-tree" is a common indexing scheme that is employed. A primary B+-tree has data records at the leaf row, while a secondary B+-tree has index keys, where a key consists of a key value and a ROWID of the data record. The index manager of a database system typically provides the following interface methods to facilitate scans:

(1) startscan( ): to start a scan on an index, optionally with some search arguments (or SARGs), which are simple conditions that can be expressed in the form of column <relop> value, where relop can be <, >, <=, >=, !=or =and column is a column in the index. If the index is on 'name' column of an Employee table, name="Joe" is an example of a SARG.

(2) getnext( ): to retrieve ROWID from the next qualifying index key. This ROWID is used by the system's data layer to retrieve the data record.

(3) endscan( ): to terminate the scan and clean up resources.

A conventional algorithm for getnext( ) would be as follows:

```
getnext ()
{
if (this is the first call to getnext())
{
    STEP 1A:
    current_page = call index traversal to retrieve the
                    scan start page latched
}
else
{
    STEP 1B :
    /* We already have a current_page and current_key */
    Latch current_page;
    STEP 2 :
    /* Check if page was modified by a concurrent transaction */
    if (the page has changed since latch on it was dropped)
    {
        STEP 2A:
        /* Need to restart scan */
        Unlatch current_page;
        current_page =    call index traversal to retrieve the
                          page containing current_key(or the page
                          that would have contained current_key if
                          it was present in the index) latched
    }
}
STEP 3:
/*
** Note that if no more qualifying keys exist on current_page, scan
** moves to its next page and current_page is set to its next page
*/
Find the next qualifying index key K
STEP 4:
/*
** Note that it is not acceptable to wait for a lock while holding latch.
** So in the following step, if lock cannot be acquired without waiting,
** then the the scan needs to unlatch current_page and sleep on lock.
*/
Lock K if scan is required to lock qualifying keys
STEP 5:
/* Copy K */
current_key = K
STEP 6:
Unlatch current_page
STEP 7:
return ROWID from K
}
```

However, in the above approach, there is a latch/unlatch operation for every qualifying key. If there are 100 qualifying keys on a page, the latched/unlatched cycle occurs 100 times.

Some systems solve this problem by using a shadow page. In that scheme, when a page is latched, all qualifying keys are copied to shadow page. Subsequently, the rows are returned from shadow page, avoiding the latch requests on the original page. However, the shadow page is a memory overhead. The present invention, in contrast, provides a methodology that solves this problem without using a shadow page. In addition, it also saves the cost of copying qualifying keys in some cases.

The preferred approach may be summarized as follows.

(1) The database system uses a "look ahead" list (LA) to save up to a preset number (e.g., 60) ROWIDs (row identifiers) from the qualifying index keys. Since a ROWID is typically small (e.g., about 6 bytes), the space needed to store 60 ROWIDs is typically much smaller than the underlying page size (which typically range from 2K to 32K in systems). Thus, in step 3 above, instead of finding just one next qualifying key, up to a selected number (e.g., 60) of qualifying keys on the current page are found and the ROWIDs from them are stored in the look ahead list.

(2) In addition to space needed for look ahead list, the approach uses space to store one index key.

The scan is considered to be in NOCOPY mode if it satisfies the following conditions:

1. The scan is not for a cursor statement, AND
2. The scan is required to hold a lock on its current row, AND
3. The scan is not for an update statement which is modifying one of the index columns.

Otherwise, it is considered to be in DCOPY mode.

If the scan is in NOCOPY mode, then copying every qualifying key is not needed. In such a case, STEP 5 is not needed. If a restart is needed, i.e., in STEP 2A, the index key is built from the data record which corresponds to last ROWID returned. On the other hand, if the scan is in DCOPY mode, then STEP 5 is omitted if latch is not being held on the index page. Instead, the index key is built from the data record and copied while holding the latch on data page. If the data layer finds that the data record does not qualify, then there is no need to build or copy the index key.

B. General Scan Design

Note that scan code (e.g., in the context of a table or index scan) is considered separate from traversal code. Scan is a client of traversal just as insert/delete/split/shrink is also. Of course, to do an index scan, one needs to traverse the index tree to locate the starting leaf page. But when one describes scans, traversal module is considered as a black box which is just invoked from scans. Also note that RID is the pageid (page identifier) and rownum (row number) of data row. A RID is never used to refer to pageid, rownum of an index row, however.

Recall that an index row has a key value with one or more RIDs associated with it. The physical position of an index key on an index page is specified by specifying the slot#, which gives the index into an offset table and rid#, which is the position in the RID list associated with the row specified by the slot#. The following discussion focuses on the index manager part of the index scan.

1. Latching

No logical locks are held on index pages of Data-only Locking (DOL) tables. Instead, latching is used to achieve physical consistency. With latching, the system's latch manager does not perform deadlock detection. Thus, the scan releases any latches held before blocking on a logical/address lock. Similarly, a latch also needs to be released before returning a row to the system's data layer. This is because the data layer may want to latch data pages and it is not desirable to latch data pages while holding latch on index page. One exception to this latching rule is that, if an index scan just wants to check if the page timestamp has changed, it may not latch the page. Accordingly, it is assumed that it is alright to read a page-timestamp without a latch. Note that this is very different from an allpage locked tables. There, the scan holds a lock on the current page until it is done with it and has moved to next page. Dirty reads are an exception; they use buffer manager primitives bufpredirty/bufdirty so that page is protected from writers.

2. Repositioning

A latch an on index page needs to be released whenever the scan needs to return a row or block on a logical lock or address lock. When the scan re-acquires the latch, it may find that the page has changed. Inserts or deletes may have happened or the page may have been split or deallocated.

If the scan were to remember only the physical position on the index page, it will not be possible to resume the scan correctly. Logical position of the scan in the index i.e., key value and RID, are needed to continue the scan. If the key is known, the index can be searched to locate the key and the scan can continue from there. This process of locating the current scan position in the index is called "repositioning." Repositioning is also done on allpage locked tables for dirty reads but a different approach, "sarg reduction" is used.

3. Copying Issues Related to Repositioning

An index scan needs a key to do repositioning. One possible way of making a key available is to copy the current key before returning a row or blocking on a logical/address lock. When the latch is reacquired, if the page has changed, the saved key can be used to do repositioning. While it can be argued that blocking on logical/addresslock is a rare event, returning a row is not. Therefore, the act of copying a key whenever a row needs to be returned, just to handle repositionings, which are rare, incurs too much overhead. The index manager therefore just remembers the RID that was returned. When repositioning is needed, the appropriate index key is built from the corresponding data row. Note that in some cases, such as dirty reads or the like, this optimization is not possible.

4. Other Copying Issues

For covered queries, the datarow is not retrieved. All columns needed by the queryproc (query processing module) are provided from the index row. Since the page is unlatched before returning the row, pointers to columns on the page cannot be provided to queryproc. Therefore, the index scan copies the index key and returns that to the data layer which returns it to queryproc. For non-covered queries, the queryproc takes all the columns that it needs from the datarow. The index manager just needs to return the RID to the data layer. In this case any copying that is done is just for the purpose of repositioning. Note that on allpage locked tables, dirty readers do copying. In other cases, a page lock allows the scan to directly return pointers to the columns in the page to queryproc.

5. Latching Optimization and Look Ahead (LA) List

A simple approach to performing a scan would be latch the index page, find the next qualifying row and return the row after unlatching the page. However, this means that if the scan needs to return N rows, N latch/unlatch operations are needed, even if there are no contention at all on the index.

To optimize this, the scan maintains a look ahead list of RIDs (LA) which can hold upto BT_SIZEOFLA(defined as 60) RIDs. When the index page is latched, multiple keys are qualified and the RIDs from keys of interest are cached in LA. The first RID is returned after un-latching the page. Subsequently, while there are more RIDs to be returned in LA, if the index page timestamp has not changed, the next RID in LA can be returned without latching index page. If the index page has changed, however, the LA needs to be discarded and the scan needs to reposition itself. So, in the best case, this can reduce latching on index page by a factor of BT_SIZEOFLA, since the index page needs to be latched once for every batch of BT_SIZEOFLA qualifying keys.

6. Serializability Issues: Range Locks

Suppose that two consecutive keys of an index are (11, R11) and (15, R15), where Rk is used to denote RID associated with key value k. A RANGE lock on R15 prevents inserts (by other transactions) between 11 and 15. This is because the inserter (module) checks for presence of RANGE lock on the key following the position of insert and blocks on it, if any. A serializability scan requests the lock manager to mark the locks requested by it as RANGE locks. Note that RANGEness is just an attribute of lock and should not be confused with type of lock i.e., shared/exclusive/update. The two are independent. It is possible to have a shared range lock or exclusive range lock or update range lock. The term SR is sometimes used for brevity to denote a scan at serializability isolation level.

7. Other Serializability Issues

On allpage locked tables, the difference between serializability and read committed isolation levels is only in releasing locks; this is handled in access routines that release locks. At level 1, the lock is actually released while at serializability; the lock is just transferred to level 3 lock chain. It actually gets released only when the transaction commits, so the difference is transparent to the index manager. However, it is not so transparent to DOL tables.

A scan at serializability isolation level does "next key" locking for phantom protection. Therefore, in addition to the rows in the range of interest, the next row is also locked. Also, not only the qualifying rows are locked but also any intervening non-qualifying rows are locked. For example, consider a scan on a unique index on one column x looking for x>=10 and x<=20 and x!=15. Suppose that index has (11, R11), (15, R15), (19, R19), (21, R21) where Rk is used to denote RID associated with key value k. Next key locking requirement means R21 needs to be locked. This prevents inserts between 19 and 21. Row R15, which corresponds to intervening non-qualifying row, is also locked. This is needed to prevent inserts between 11 and 15. queryproc tells the index manager what type of locks need to be acquired i.e., SHARED/UPDATE or EXCLUSIVE. However, the locks on next key and intervening non-qualifying rows are always acquired in shared mode. They are needed just for phantom protection, and hence do not need to be locked in update or exclusive mode, even if the scan is for a range update or delete statement. The blocking/restart logic is also more complicated for serializability isolation level.

C. SCANS: High Level Design

The following description will discuss scan basics, including how a scan is started, what is its qualification, and how the scan is terminated. Various isolation levels and locking behaviors supported are also discussed. Next, the interaction between scans and splits/shrinks and repositionings are described, together with latching and copying issues and how they affect repositioning. Finally, index "look aside" optimization and multi-column range scan optimization are described.

1. Scan Basics

Consider the query: select * from T where x>=10 and x<=20 and y=40. Assume that an index I(x,y) exists and is chosen by the optimizer to do the scan. The low bound for the scan is formed by putting together the low values for individual columns, if any. Low value for x is ">=10" and low value for y is "=40". So in this example, the bound (>=10, =40) is the low bound for the scan and is passed to the traversal module. The traversal module uses the low bound to locate the starting position for the scan in the index i.e., leaf page, slot# and rid# of the index row on which scan needs to start.

Depending upon what predicates have been specified by the user, low values may or may not exist for an index column. If no low value exists for an index column, the low values of any subsequent index columns cannot be used in the low bound. If the predicate x>=10 were not there, the low value for y cannot be used in low bound. If there is no low value for the major column of the index itself, there is no low bound for the scan. In such cases, scan needs to be started on first leaf page. The high bound for the scan is formed by putting together the high values for the individual index columns, if any. In the above example, the high bound for the scan is (<=20, =40). If there is no high value for an index column, any high values for the subsequent index columns cannot be used in high bound for the scan. The high bound is used to decide when the scan can be terminated.

Once the traversal has located the starting index row for the scan, the scan starts qualifying the index rows from that point onwards until the high bound of the scan has reached 1. Qualification involves applying all the sargs 2 on index columns. In a B1 server, it also includes performing B1 MAC checks. In parallel scans, it also includes checking if the RID maps to the thread. Note that sargs on index columns that could not be used in low bound or high bound of the scan are also considered while qualifying (for example, sargs with !=operator, and the like).

Now, consider how the high bound of the scan is used to decide when to terminate the scan. In the above example, assume that the index has the following (only the key values are shown, RID is omitted for brevity).

. . . . . . . . .
[10, 40] ---------- starting point for the scan
[15, 40]
[17, 38]
[18, 40]
[19, 100]
[20, 30]
[20, 50]
. . . . . . .

Can the scan be stopped at [17, 38]? Although that row is not a qualifying row, the scan cannot be stopped because neither high value on x (i.e., 20) nor the high value on y has been reached. Can the scan be stopped at [19, 100]. No, because high value on x has not been reached. The scan cannot be stopped at [20, 30] because although high value on x has been reached, and the high value on y has not been reached. The scan can be stopped at [20, 50], because high value on x has been reached and the high value has been exceeded. There cannot possibly be more qualifying rows beyond this point.

2. Repositionings (Restarts)

The following discusses why restarts happen and how restarts would be handled if one were not using look ahead lists and the index manager always copied the key before returning RID. This is followed by a discussion of LA, copying optimizations, and how they affect restarts.

Two new terms are introduced: "RESTART_AT" and "RESTART_AFTER". To RESTART_AFTER some key, say ["bob", 80.2], means traversal (module) is called to locate ["bob", 80.2]; even if the key is found in the index, the scan skips ["bob", 80.2] and starts qualifying from the next key in the index. On the other hand, to RESTART_AT ["bob", 80.2] means that if the key if found in the index, the scan qualifies keys starting at ["bob", 80.2], i.e., ["bob", 80.2] is qualified too. Note that if traversal does not find ["bob", 80.2] in the index, it automatically positions the scan on the next logical key in the index. Here, the scan would start qualifying at the key on which traversal positioned it and, consequently, both RESTART_AT and RESTART_AFTER would behave the same way.

(1) The Path Saved in Scan Context

During an index scan, a "scan context" data structure keeps track of current scan page i.e., pageid, pagets at the time of last latched access to the page and buffer holding current scan page. In addition, whenever the scan calls traversal (module), the level 1 index page that was searched is also remembered in the scan context. For the level 1 page, only pageid and pagets are remembered but not the buffer holding the page. Whenever the scan needs to do repositioning, it passes the saved path i.e., current scan page and the level 1 page that the scan encountered during it last traversal and their timestamps to traversal. It is traversal's responsibility to check if those pages are valid and, if so, use them for optimizing the search in the index and discard them otherwise. The following focuses on what is the restart key that the scan passes to traversal to do the repositioning.

Restarts are due to three reasons. These will now be discussed in turn.

(a) Restart W/O Lock Waits (Abbrev. R1)

All latches must be dropped before index manager returns a row to data layer. There are two cases of restart without lock wait.

A) When the data layer calls the index manager to retrieve the next row, the index manager may find that page has changed. Suppose that last row returned by the index manager was ["bob", 80.2]. Then it needs to RESTART_AFTER ["bob", 80.2].

B) If the index manager did not return the row locked, and if the data layer finds that the index page has changed by the time it read and latched data page, the data layer calls index manager to retrieve same row again. Suppose that the last row returned by the index manager is ["bob", 80.2], then it needs to RESTART_AT ["bob", 80.2].

(b) Restart with Address Lock Wait(Abbrev. R2)

When an index scan is crossing page boundaries, if the next page is undergoing shrink or if it is an SR and next page is undergoing split, it needs to block. On wakeup, if page has changed, it needs to restart. In addition, when the scan is crossing a page boundary, it may decide to deallocate the current page if it is full of committed deletes. After deallocating the page, it restarts. Although no lock wait is involved in this case, saving the key value and the repositioning is very similar to case where scan needs to block on a page being shrunk by another xact. Suppose that ["bob", 80.2] was the last row returned by the scan and ["larry", 90.6] is the first index key on the page being split/shrink by another xact (or the page which the scan it-self is planning to shrink). Note that ["larry", 90.6] could be a committed deleted key. For non-SRs, the scan can RESTART_AT ["larry", 90.6].

For SRs, however, the scan cannot RESTART_AT ["larry", 90.6]. This is because another xact (transaction) could insert an index key between ["bob", 80.2] and ["larry", 90.6], and that would be considered a phantom for SR. This is because SR would skip it now but would return it if the same scan were done again by the user initiating SR scan. Can the SR RESTART_AFTER ["bob", 80.2]? There are two issues here. The first issue is as follows. If ["bob", 80.2] were the last row returned by the scan, their still could be an arbitrarily large number of non-qualifying index keys between ["bob", 80.2] and ["larry", 90.6]. Since they did not qualify, they were not returned by the index manager and the keys were not copied. If the index manager were to RESTART_AFTER ["bob", 80.2], it needs to rescan all those keys. Restarting at a point arbitrarily behind the current scan position is not acceptable since it could potentially cause starvation and infinite loops. Note, however, that SR would have locked all those intervening non-qualifying keys. So it can build index key from last locked datarow and RESTART_AFTER that key. So an SR needs to maintain RID that was last locked and use that to get restart key to avoid restarting arbitrarily behind the current scan position. This is referred to as rid_lastlock.

As a second issue, one does not want to read data page corresponding to a non-qualifying key just to get a restart key. This could mean an extra physical I/O just to do re-start. Also, if the scan is a covered query, it is not a good idea to read data page for the purpose of restart. So whenever rid_lastlock corresponds to a non-qualifying key, the system also maintains the slot# of that key on the index page and refer to it as slot_lastlock. This way, when one needs the key value corresponding to rid_lastlock, if it is a non-qualifying key, the key value can be copied from slot_lastlock slot on the index page rather than reading the data page. The slot_lastlock is tracked until the latch on that index page needs to be released. In case the scan needs to unlatch the index page before it gets its next lock (for example, because the next key is not on the current page and the next page is undergoing split or shrink and the scan needs to block on addresslock), the key value is copied from slot_lastlock and then the index page is unlatched. On the other hand, if the next lock is acquired before the latch is dropped, then rid_lastlock can be set to the RID on which the new lock was obtained. If the new lock were obtained on a non-qualifying key, slot_lastlock is also set. Otherwise, slot_lastlock is set to BT_INVALID_SLOTNUM and is not looked into. Note that rid_lastlock cannot correspond to a committed delete key. A committed deleted key can get garbage collected at any time and would not guarantee any protection against phantoms. On the other hand, a range lock on a key that is not a committed delete would block inserts between that key and preceding (non committed deleted) key.

(c) Restart with Logical Lock Wait (Abbrev. as R3)

Whenever an index scan requests a lock, if it does not get it and if SKIP_IF_NOLOCK has not been specified (i.e., it is not doing "read past" locking), then scan needs to drop all latches and sleep for the lock. On wakeup, it may find that page has changed and it needs to re-start. Suppose that ["larry", 90.6] is the key on which the scan failed to get a lock. For non-SRs, scan can copy the key ["larry", 90.6] and then sleep on the lock. After wakeup, if the page has changed, it can RESTART_AT ["larry", 90.6].

For SRs, copying ["larry", 90.6] and doing RESTART_AT that the key would not work. The reason is as follows. Suppose that the previous key locked by SR was ["bob", 80.2], then, while the SR is sleeping on lock for 90.6, another xact (transaction) inserted a new key between these two keys. It would become a phantom for SR. So, SR again relies on rid_lastlock as in case of retsart with addresslock wait. In this example it is 80.2. If rid_lastlock corresponds to a qualifying key, when the scan returned that RID, it would have copied the key into the scan context and so there is no need to copy anything now. On the other hand, if rid_lastlock corresponds to a non-qualifying key, the key is copied from slot_lastlock and then the scan sleeps on the lock after releasing any latches held. After wakeup, if page has changed, RESTART_AFTER is done using the ["bob", 80.2].

3. Look Ahead (LA) RID List

In order to optimize latching, a look ahead list (LA) is used. Multiple rows are qualified and the RIDs of the rows of interest are put in LA. The benefit of LA is that, in the no contention case, the index page needs to be latched once for every BT_SIZEOFLA rows instead of once for every row.

LA can contain up to BT_SIZEOFLA (defined currently as 60) RIDs. If one wants to track the offset table slot# and RID# for all of the index keys whose RIDs are in LA, there is a 4 byte overhead for each entry in LA. So the system does not track positions of each of those index keys on index page. It is enough to track the position of index key corresponding to the last RID in LA to be able to continue the scan after all the rows in LA have been processed. The blocking module needs to know the slot# (but not the RID#) of the key corresponding to RID in LA, so only these are tracked in index scan context.

For non-SRs, LA contains only RIDs from qualifying keys. For SRs, LA contains RIDs of qualifying rows as well as the non-qualifying keys in the scan range. This is because, for SRs, non-qualifying keys also need to be locked. Although one may qualify multiple rows ahead, it is not desirable to lock them all at the time of qualification itself. The locking is done only when at the time that the system is returning the row to data layer. This is to reduce lock duration as well as for simplicity. It is not desirable for the qualification module to worry about blocking on locks or the like. LA never spans an index page i.e., all RIDs in LA are from index keys on the same index page.

There are two cases where LA is prematurely terminated. When an uncommitted delete is encountered (not for cases like dirty reads where SKIP_ALWAYS has been specified for uncommitted deletes), there is likely to be contention on the index and so it may not desirable to qualify further. Not terminating LA on encountering an uncommitted delete would add complexity to blocking/restart logic. If LA contains RIDs from both qualifying and non-qualifying keys, the scan needs to somehow remember which ones correspond to qualifying keys and which ones do not. This requires at least 60 bits. The extra complexity does not appear worthwhile. If the system terminates LA on encountering a non-qualifying key, one would need only one bit to remember whether the last entry in LA corresponds to a qualifying key or not. This means that:

(A) At most, the last RID in LA can be deleted RID. ALL others are non-deleted ones.

B) At most, the last RID in LA can correspond to a non-qualifying key.

4. Copying Issues

As discussed in the design overview, there are two reasons why copy may be needed within the index scan module. Since the index scan module releases all latches before returning control to data layer, for covered queries the copying is needed so that the queryproc can be given stable pointers to columns that it needs. This is not an issue for non-covered queries because queryproc takes the columns that it needs from datarow in that case, and data layer provides it with stable pointers to columns in datarow. The system does not optimize copying for covered queries. The index manager makes a copy of every index key that it returns to the data layer. In addition, the index manager itself needs an index key to reposition the scan and hence the key may have to be copied for repositioning purposes. Repositioning is an issue for both covered and non-covered queries alike. The system optimizes copying the key value for non-covered queries in those cases where it is possible to build index key from datarow at the time of repositioning.

Query processing always allocates BT_MAXCOPYSPACENEEDED bytes of space for the index scan. BT_MAXCOPYSPACENEEDED is an interface macro provided by the index manager to queryproc so that queryproc can find out how much space is needed by the index scan module.

5. Copying Modes

There are three basic modes with respect to copying. Each will be discussed in turn.

(a) ICOPY Mode (1) General

Figure 3:
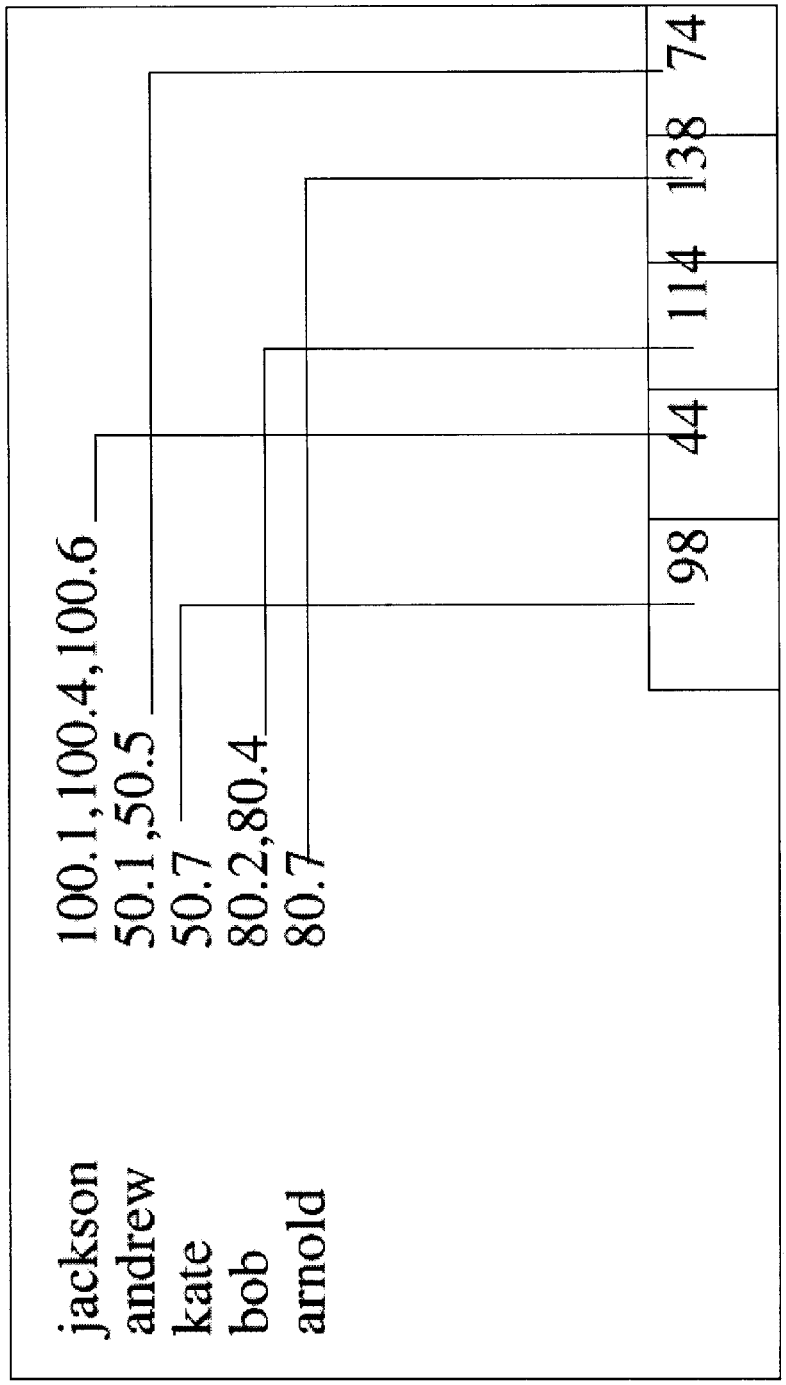
FIG. 3 is a block diagram of a leaf page of an index, for illustrating ICOPY mode.

This is used for covered queries (note that some trace flag may force ICOPY mode which is not discussed here). A shadow buffer is maintained and used to store the key values corresponding to the RIDs in LA, except that if the last RID corresponds to non-qualifying row (SR only), the key value corresponding to it is not stored. In that case, space allocated by the queryproc is used to store LA and also the offsets of the index keys corresponding to the RIDs in LA in the shadow buffer. The index keys are copied into shadow buffer at the same offsets as the original page. Thus, the space needed is the space for LA plus the space for storing BT_SIZEOFLA offsets, which is 6*60+60*2 (i.e., 480 bytes total). The shadow buffer is obtained by taking a buffer from buffer cache. Consider the example is shown in FIG. 3. A leaf page of an index on first name (fixed length column) is shown, where the scan is looking for name>="bob" and name!="Jackson".

(2) Non-SRs

LA will contain RIDs corresponding to bob and kate: [80.2, 80.4, 50.7]. The shadow buffer would contain two keys bob and kate at offsets 138 and 98 respectively (i.e., the same offsets as the original leaf page), as shown in FIG. 4A. Note that there is no offset table and also rows have been copied in non-dup format.

(3) SRs

Figure 4B:
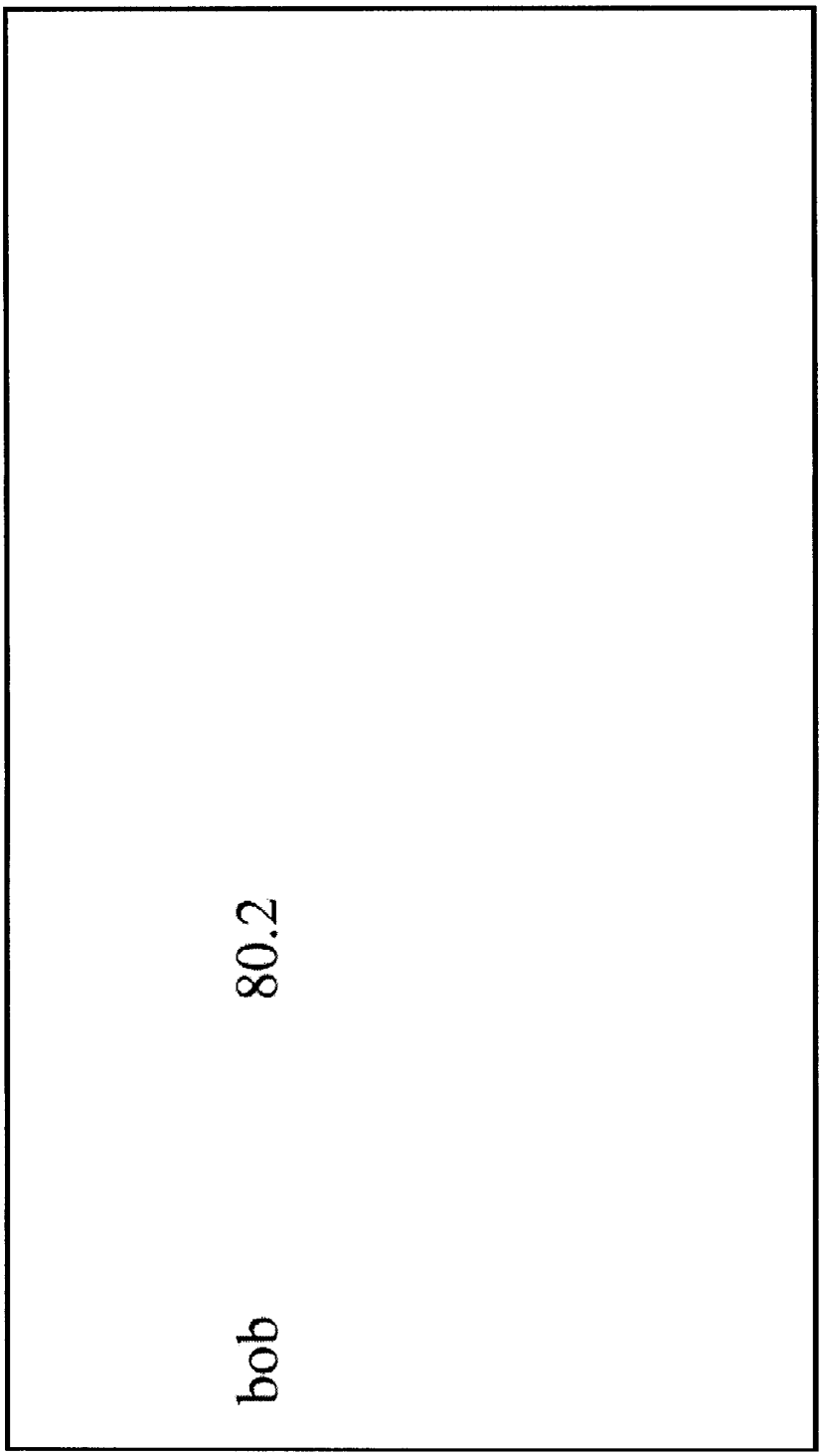

Recall that for SRs, even the non-qualifying keys need to be locked. Also, LA is terminated when an entry corresponding to a non-qualifying key is put. LA will contain RIDs corresponding to bob and jackson: [80.2, 80.4, 100.1]. A bit is set in index scan context (BT_SC_LASTRID_NOQUAL) to remember that the last entry in LA is a non-qualifying one so that it will not be returned to data layer. The shadow buffer appears as shown in FIG. 4B. "jackson" is not copied since it is a non-qualifying key value although its RID has been put in LA since it needs to be locked for phantom protection.

In addition, space allocated by the queryproc is used to store the array of offsets [138, 138, 44]. For each entry in LA, there is an entry in this array of offsets giving the offset of the corresponding key value in the shadow buffer. When the index manager returns first row, sdes→scur will be set to 80.2 and sdes→srow will be made to point to offset 138 in shadow buffer. sdes→srow contains stable copy of the key and the queryproc takes the columns that it needs from that.

(b) DCOPY Mode

This is used if (1) the scan is a cursor, or (2) the index manager is not doing locking, or (3) index manager is doing instant duration locking, or (4) if the index columns could be updated during scan. It turns out that these are the cases where index key cannot be built from the datarow at the time that the repositioning is needed, either because no lock is being held on the datarow or, although a lock is held, the same session could have modified the index columns and therefore, building the key from datarow would not give the desired key value. There is no shadow buffer. The key is copied in a space allocated by queryproc. Unlike in the ICOPY mode, there is no need to have an array of offsets in this case. The space allocated is enough to save one key only and so at most one key is saved in this case at any given time. The space needed in this case is the space for LA plus the maximum index key size (i.e., 6*60+650 or 1010 bytes). Ideally, one should be allocating space based on maximum key size for this index rather than max index key size. Accordingly, a variation of the macro BT_MAXCOPYSPACENEEDED is provided which calculates amount of space needed optimally based on max key size for the index involved.

There are many entries in LA but there is space to store only one key. Now consider at which key is saved at what point. Before the first RID in LA is returned to data layer, the corresponding key value is copied from index page. For other RIDs, the copy of key value is done from data row and only if the data row qualifies 8. It is done at the time data layer has finished qualification and has done any locking that is needed. If the datarow does not qualify, the key value is not copied from datarow. If the key value was not copied, the corresponding RID in LA is zeroed out (so that index manager can remember that the key value corresponding to that entry in LA has not been copied). It is important to understand that the index page does not have to be latched to copy key value while processing the second through the last RID in LA.

The LA looks exactly the same as in the case of covered queries. However, in that case there is no shadow buffer and no array of offsets associated with LA. When the index manager returns first row, sdes→scur will be set to 80.2 and "bob" would have been copied into space allocated by QP. sdes→srow will be NULL'd. Data layer may set sdes→srow to stable copy of data row or it may make columns needed by QP available elsewhere. Those details are not part of index manager modules and hence will not be presented here. When the index manager is asked to return next row, assuming that the page has not changed, sdes→scur will be set to 80.4 and sdes→srow is set to NULL. The data layer now qualifies 80.4 and does any locking/blocking that it needs to do 9. If row qualifies and any locks needed have been acquired, key value "bob" is copied from datarow 10. Let us assume that datarow 80.2 does not qualify the sargs on non-index columns. Then, the 2nd entry in LA is zeroed out and LA would like [80.2, 0.0, 50.7] for non-SRs and [80.2, 0,0, 100.1] for SRs. The zeroing out is done so that index manager can track what was the last entry in LA for which corresponding key value was copied from datarow. When the index manager is asked to return next row, if the index page has changed, it will search LA backwards from current position looking for non-zero RID and it would find 80.2. The key value is picked up from scan context and in this case it is "bob". So the scan would do RESTART_AFTER ["bob", 80.2].

The benefit of this scheme over ICOPY mode is that no shadow buffer is needed, and if a lot of data rows are not qualifying, there is no need to copy key value from them. Recall that if the scan is not an SR, delayed locking is used when there are sargs on non-index columns. Since the index manager does not do locking, DCOPY mode is used for such non-covered queries. It is expected that a lot of datarows would not qualify the sargs on data columns in such cases.

(c) NOCOPY Mode

This mode is used in cases not included in ICOPY/DCOPY modes. In these cases there is no need to copy the key value whenever the index manager returns a RID to the data layer. Copy is done only if there is a need to block. In other cases, if there is a need to reposition the scan, the key is built from the datarow. Another thing to note is, if scan is doing "read past" locking and it fails to get a lock on some RID in LA, it zeroes out that entry in LA and moves on to the next RID in LA. The zeroing out is a way of remembering that the scan did not get a lock on that datarow/datapage and hence it should not try to build index key from such a RID. Note that QP will still allocate BT_MAXCOPYSPACENEEDED bytes of space for the index scan.

The LA looks exactly same as in the case of DCOPY mode. However the no key value is copied from either index page or data page, unless the scan needs to block or restart. When the index manager returns first row, sdes→scur will be set to 80.2. sdes→srow will be NULL'd as before. When the index manager is asked to return next row, assuming that the page has not changed, sdes→scur will be set to 80.4 and sdes→srow is set to NULL. Nothing is copied from the datarow regardless of whether it qualifies. In case that the system is performing read past locking and the scan cannot get a lock on 80.2, the second entry in LA is zeroed out and LA would appear as [80.2, 0.0, 50.7]. Note that SRs do not do "read past" locking; hence, the scan has to be a non-SR. So when the index manager is asked to return next row, if the index page has changed, it will search LA backwards from current position looking for non-zero RID and it would find 80.2. The key value is built from data row 80.2 and in this case it is "bob". Thus, the scan would do RESTART_AFTER ["bob", 80.2]. The benefit of this scheme is that there is no need to copy if no contention exists, i.e., no blocking/re-starts.

6. How Copying Modes and LA Affect Restarts

Previously, it was discussed how restarts would be done in the absence of LA and copying modes. Now one may look at how copying modes and LA affect the three types of restarts.

(a) Effect of LA

While processing the first RID in LA, the effect is same as if one did not have LA. When processing other RIDs, however, special casing is needed. The main difference that LA causes is that, when making a conditional lock request on a RID other than first RID in LA, the latch is not held on the index page. Without LA, if the conditional lock request fails, for non-SRs, one would have copied the key on which one failed to get the lock from the index page. This cannot always be done in the presence of LA. Recall that the slot#, rid# corresponding to each entry in LA are not known. One only knows the slot# corresponding to first entry in LA and to the last entry in LA, in cases where LA was prematurely terminated because of encountering an uncommitted delete or a non-qualifying key. So in cases where slot# is not available, the system copies the key from data page. Note that the system does not have a lock on the data row: therefore, the data page access is done using same protocol as dirty reads, i.e., latch data page and check if index page has changed. In case the index page has changed by the time datapage is latched, it is treated as restart without lock wait case.

Even for SRs, some special casing is needed when the scan is processing nth RID in LA where n is not equal to 1. Recall that for SRs, one needs to maintain the RID that was last locked (rid_lastlock). If it does not correspond to a qualifying key, the slot# corresponding to it also needs to be maintained. LA causes some difference in the way these are obtained. If the scan is current positioned at nth RID in LA, where n is not equal to 1, the previous RID (actually previous the non-zero RID) in LA serves as rid_lastlock. Since RIDs other than last RID in LA always correspond to qualifying keys, slot_lastlock is not needed in this case. Initially, rid_lastlock is initialized to 0.0. Whenever all RIDs in LA have been processed, the last non-zero RID that does not correspond to a committed delete is saved in rid_lastlock. If that corresponds to a qualifying key, slot_lastlock is not needed. Otherwise, it must be the last RID in LA and the corresponding slot# is available in the scan context and is copied into slot_lastlock. Therefore, if the scan is currently positioned at first RID in LA, rid_lastlock and slot_lastlock are available in the same way as they would be if LA were not being used.

(b) Effect of Copying Modes

In the previous section on restarts, it was assumed that the index scan would always copy the key before returning the RID. This may be referred to as a SIMPLECOPY mode. In ICOPY mode, this is true except that the shadow buffer has multiple keys and if the scan is currently positioned at nth RID in LA, the corresponding key in shadow buffer needs to be used. Recall that if LA has N entries, scan context has an array of size N holding offsets of the corresponding key values in shadow buffer. That array can be used to get the corresponding key value. In DCOPY mode, the system performs copying if the datarow qualifies. Thus, this is similar to the SIMPLECOPY mode except that what is saved in scan context is a key corresponding to last row returned to queryproc rather than last row returned to data layer. The ZEROed out RIDs in LA correspond to those datarows for which index key qualified but not data. The key that one has in the scan context corresponds to last non-zero RID in LA preceding the current position in LA.

The NOCOPY mode does not attempt to do any optimization when there is a need to block on addresslock or logical lock. All it optimizes is that when a RID is returned to data layer, no copy is kept of the corresponding key value. In the SIMPLECOPY mode, the key is saved at the time that RID is returned to data layer, but in NOCOPY mode one has the assurance that one can build it from datarow when needed. Thus, the NOCOPY mode is like a "virtual" copy and an easy extension of SIMPLECOPY approach. The Appendix A has details of how each of the three types of retsart are handled in presence of LA and copying modes.

D. SCANS: Low Level Design

The main interface functions provided by the index manager are bt_startscan( ), bt_getnext( ) and bt_endscan( ). bt_startscan( ) is called to start an index scan. It just initializes the various fields of index scan context but does no other work. Some of the important fields that it initializes are resources such as locks and kept buffers, path that is saved in scan context, copying mode for the scan i.e., whether scan will be done in NOCOPY, DCOPY or ICOPY mode and the status bits.

bt_getnext( ) is the routine that returns the rows. The RID is returned in sdes→scur. For covered queries, a stable copy of the key is made available in sdes→srow. This is the work horse routine of the scan. It manages most of the state transitions in the scan by checking what state the scan currently is in and calling the appropriate lower level function to handle that state. bt_endscan( ) is called when scan has finished returning all qualifying rows, indicated by bt_getnext( ) returning NULL. Sometimes it is also called to terminate the scan abruptly either because of errors or because of row limits have been set (through set rowcount, for example). bt_endscan( ) does nothing more than releasing the resources like locks and kept buffers. The following first examines the index scan context and extended scan context, and then the function bt_getnext( ) to get a feel for the control flow in the scan.

1. Index Scan Context

The following is the structure definition and various status bits of index scan context. Index scan context is part of SDES. It exists in a union with oam (i.e., object allocation map) scan context, rid scan context, and sort scan context.

```
/* size of look ahead rid list */
#define BT_SIZEOFLA 60
/* Type definitions for slot number and rid number of an index row */
typedef int16 BT_SLOTNUM;
typedef int16 BT_RIDNUM;
typedef uint32 BT_TSLO;
/*
** scan state bits
**
** BT_SC_ICOPY_NEEDED-scan needs to copy key from index row
** for each qualifying key
**
** BT_SC_DCOPY_NEEDED-scan needs to copy key from datarow
** for each qualifying key(sometimes we
** do copy from index row itself)
**
** BT_SC_COPY_NONEED-copy not needed. Index key can be
** built at the time of restart
**
** BT_SC_ONEROW - whether only one row is needed
**
** BT_SC_SPANSPAGE-whether the scan was confined to just
** one page
**
** BT_SC_EMPTYPGS_SKIPD-whether scan skipped empty
** pages(needed for SRs only)
**
** BT_SC_CURPGDONE-whether qualification was done with this
** page
**
** BT_SC_LASTRID_NOQUAL-whether last rid in LA is qualifying
** one or not
**
**
** BT_SC_ENDSCAN-whether qualpage encountered end of
** scan row during qualpage. Note that qualpage
** qualifies many rows and so scan is ended only
** when rows that qualified have actually been
** returned to index manager client.
**
** BT_SC_CURLOCKINFO-whether btsc_curlockinfo is in sync with
** btsc_curlock or btsc_prevlock.
**
** BT_SC_CURSOR - whether index scan is for a cursor
**
** BT_SC_COVERED-whether index scan is for a covered query
**
** BT_SC_NONCONTIGUOUS-whether the qualifying rows are
** contiouous
**
** BT_SC_ERROR - whether scan encountered error -**
interrupt or deadlock.
**
**
** BT_SC_RETRYNKL-caller should retry for getting next
** key lock
** BT_SC_TRY_MCROPT-multi column range scan optimization
** recommended. Set when scan sees many
** non-qualifying rows contiguously
** BT_SC_SHRINKERR-whether scan encountered error when it
** attempted shrink. Since shrink is not
** needed for correctness of scan, scan
** simply continues.
** BT_SC_NOT_1stGETNEXT -whether 1st call to getnext
**
```

-continued

```
** BT_SC_PREVROW_DUP-previous row is from same duplicate
** group as the row returned before that
**
** BT_SC_TRY_LEAFLOOKASIDEUse index lookaside optimization
** on leaf
**
** BT_SC_TRY_LOOKASIDE-Use index lookaside optimization(either
** on both leaf and parent or just parent)
*/
#define BT_SC_ICOPY_NEEDED0x00000001
#define BT_SC_DCOPY_NEEDED0x00000002
#define BT_SC_COPY_NONEED0X00000004
#define BT_SC_SPANSPAGE 0x00000008
#define BT_SC_ONEROW 0x00000010
#define BT_SC_EMPTYPGS_SKIPD0x00000020
#define BT_SC_CURPGDONE 0x00000040
#define BT_SC_LASTRID_NOQUAL0x00000080
#define BT_SC_ENDSCAN 0x00000200
#define BT_SC_CURLOCKINFO0x00000400
#define BT_SC_CURSOR 0x00000800
#define BT_SC_COVERED 0x00001000
#define BT_SC_NONCONTIGUOUS0x00002000
#define BT_SC_ERROR 0x00004000
#define BT_SC_RETRYNKL 0x00008000
#define BT_SC_TRY_MCROPT0x00010000
#define BT_SC_SHRINKERR 0x00020000
#define BT_SC_NOT_1stGETNEXT0x00040000
#define BT_SC_PREVROW_DUP0x00100000
#define BT_SC_TRY_LEAFLOOKASIDE0x00200000
#define BT_SC_TRY_LOOKASIDE0x00400000
/* Lock information
** btli_pageno - page number of rid/data page on which lock is held
** btli_locktype- FGLK_DEFAULT or FGLK_SHARED
** btli_lockinstant- LOCK_INSTANT or 0
** btli_rownum - 0 for data page locking and rownum of rid on which
** lock is held for datarow locking.
**
** NOTE: index scan context has two locks btsc_prevlock
** and btsc_curlock.
** The status bit BT_SC_CURLOCKINFO indicates whether lockinfo
** stored in btsc_curlockinfo refers to the lock in btsc_prevlock
** OR btsc_curlock.
**
*/
typedef struct bt_lock
{
    pgid_t btli_pageno;
    int btli_locktype;
    int btli_lockinstant;
    uint16 btli_rownum;
} BT_LOCKINFO
/*
** Current Scan position:
**
** btsc_curbp : buffer holding current scan page
** btsc_curpgts : current scan page timestamp
** btsc_slotnum : slot number on index page from which
** last rid in LA was taken
** btsc_ridhum : rid number on index page from which
** last rid in LA was taken
**
** btsc_indptr : A ptr to sysindexes row of index being scanned
**
** Repositioning info:
**
** btsc_parent : path from root that was traversed during
** latest scan restart(or scan start if
** there were no repositionings since then)
** btsc_memptr : pointer to free space
** For non-covered queries, this is used to
** save restart key.
** For covered queries, this is used to store
** offsets of qualifying rows.
** btsc_keyptr : Same value as btsc->btsc_memptr for non
** covered queries. For covered queries,
** we copy several keys into shadow buffer
** and so this points to current key.
** btsc_keylen : length of the key being pointed by
** btsc_keyptr
```

```
**
** Status bits:
**
** btsc_status : See bits defined above
**
**
** Look ahead rid list
**
** btsc_LA : look ahead rid list
** btsc_LAcur : pointer to current rid in btsc_LA
** btsc_LAmax : pointer to last rid in btsc_LA
**
** btsc_isolevelinfo: pointer to isolation level info
**
** Locks
**
** btsc_revlock: lock on previous row
** btsc_curlock : lock on current row
**
** Used for multi column range query optimization
** btsc_nonqualkeycnt: #contiguous non-qual keys encountered after
** the last qualifying one
**
**
** btsc_qualbitlast: tracks the slot at which qualification was
** stopped because of encountering many non
** qualifying rows.
**
** btsc_MCRlimit: # continuous nonqualifying rows at which
** MCROPT will be triggered
**
** Used for Index Look aside optimization
** btsc_ILAhits : Tracks if ILA was useful or could have been
** useful and based on that it is decided
** whether to switch it on or off
** btsc_ILAendpg: The page on which scan ended. Used only if
** start scan on same index again.
**
** Used for diagnostic purposes:
** btsc_ridlastlockfail: The rid on which scan encountered cond
** lock failure most recently
**
** btsc_ridlastrestart: The rid on which scan did most recent restart
*/
typedef struct bt_scancontext
{
    BUF *btsc_curbp;
    BT_TSLO btsc_curpgts;
    BT_SLOTNUM btsc_curslot;
    BT_RIDNUM btsc_ridnum;
    PAGEANDTS btsc_parentpg;
    BUF *btsc_shadowbp;
    BYTE *btsc_memptr:
    BYTE *btsc_keyptr;
    int btsc_keylen;
    BT_RID *btsc_LAcur;
    BT_RID *btsc_LAmax;
    BT_RID *btsc_LA;
    unsigned short *btsc_offsets;
    struct index *btsc_indptr;
    ISO_BEHAVIOUR_FOR_SCAN*btsc_isolevelinfo;
    BT_LOCKINFO btsc_curlockinfo;
    LOCKREC *btsc_prevlock;
    LOCKREC *btsc_curlock;
    uint32 btsc_status;
    BT_SLOTNUM btsc_qualbitlast;
    uint16 btsc_nonqualkeycnt;
    uint16 btsc_MCRlimit;
    BYTE btsc_ILAhitsleaf;
    BYTE btsc_ILAhitsparent;
    pgid_t btsc_ILAendleaf;
    pgid_t btsc_ILAendparent;
    BT_RID btsc_ridlastlockfail;
    BT_RID btsc_ridlastrestart;
} BT_SCANCONTEXT;
```

2. Extended Scan Context

An extended scan context may be defined to include those important data items that part of scan state but do not really need to be maintained across calls to bt_getnext( ). So how are they different from local variables in bt_getnext( ). In theory, they are not but many of these data items play very important role in understanding scan and hence a separate structure BT_GNEXT has been defined to contain these. This state maintained in this structure is also called as extended scan context. BT_GNEXT is not part of SDES but is declared on stack in bt_getnext( ) function.

```
/*
** BT_GNEXT:
** Extended Scan context
**
** Perhaps code would have been a little easier to understand if the
** following were explictly stored in scan context. But these members
** don't really need to be tracked across calls to bt_getnext() and
** hence to conserve space in sdes, they are all stored on stack in
** bt_getnext() routine.
**
**
** btg_rid_lastlock :This field makes sense only for level 3 readers.
** The rid that was last locked and can be used as
** restart rid by SRs.
**
** btg_key_lastlock :Only for level3 readers. Pointer to keyvalue
** that corresponds to btg_rid_lastlock.
**
**
** btg_qual_lastlock :Was the lock obtained on a qualifying row or non
** qualifying row.
**
** btg_slot_lastlock :Slot number on index scan page from which RID
** referred in btg_rid_lastlock was taken.
**
** btg_ipgid_lastlock: To help in sanity checking btg_slot_lastlock.
** The index page that btg_slot_lastlock is
** referring to.
**
** btg_ipgts_lastlock: To help in sanity checking btg_slot_lastlock.
** The pagets of index page that
** btg_slot_lastlock is referring to. Obviously
** it does not make sense to interpret slot# if
** the index page has changed since then.
**
**
** btg_slot_1stridLA :Slot number corresponding to first rid in LA.
**
** btg_curlatch :indicate whether current index scan page is
** latched. Has same values as BUF_LATCH returns
** in latchresult parameter.
**
** btg_prevbp : If previous scan page was not unkept yet, it is
** tracked here.
**
** btg_prevtslo:Makes sense only if btg_prevbp is not NULL and has
** low 4 bytes of its remembered TS
**
** btg_prevlatch :Makes sense only if btg_prevbp is not NULL and is
** used to track if prevbp is latched.
**
** btg_lockstat :The lock manager return status
**
** btg_nonqualpgcnt:Number of non-qualifying pages encountered
** during this call to bt_getnext(a page is
** considered non-qualifying if no row on it
** qualifies)
**
*/
typedef struct bt_gnext
{
    BT_RID btg_rid_lastlock;
    BYTE *btg_key_lastlock;
    BT_SLOTNUM btg_slot_lastlock;
    pgid_t btg_ipgid_lastlock;
    BT_TSLO btg_ipgts_lastlock;
    SYB_BOOLEAN btg_qual_lastlock;
    int btg_type_lastlock;
    BT_SLOTNUM btg_slot_1stridLA;
```

-continued

```
    int btg_curlatch;
    int btg_prevlatch;
    BUF *btg_prevbp;
    BT_TSLO btg_prevtslo;
    int btg_lockstat;
    uint16 btg_nonqualpgcnt;
} BT_GNEXT;
```

3. bt_getnext( )

The index scan goes through several states and the state transitions are complex to manage. The following examines the important states of scan and which lower level functions handle what states.

(a) BT_GSTATE_ADVANCELA

This service to advance the position in LA. This is the main entry state for bt_getnext except in two cases.

(1) Very First Call to bt_getnext in the Scan

In this case, bt_getnext( ) calls bt_getstartpg( ) to retrieve the staring page for the scan. bt_getstartpg( ) finds out whether scan has low bound or not and sets up the sargs appropriately to call the traversal routine bt_traverse( ). In the case of index look-aside optimization, it also takes care of passing the search path in the scan context from previous scan to traversal( ). When traversal( ) returns control to scan module, the routine also takes care of saving the path traversed (just the leaf page and the parent page) in the scan context. The repositioing module also calls bt_getstartpg( ) once it has found the restart key and bt_getstartpg( ) takes care of setting up the sargs appropriately and calls traversals. Even in the repositioning case, this routine takes care of transferring the search path from scan module to traversal before calling traversal and then from traversal to scan. When bt_getstartpg( ) returns, LA is empty and so state is set to BT_GSTATE_LADONE.

(2) If Access Wants SAME Index Row Again Rather Than Next One

Recall that this happens when index scan has returned a RID to data layer without holding a lock on it but by the time data layer has latched the data page, it found that index page has changed and so it wants the index manager to return same row again. In this case, state is set to BT_GSTATE_RESTART. Note that this state is also entered when bt_getnext wants to skip a rid in LA, for example, if it is a deleted/non-qualifying one.

(b) BT_GSTATE_PROCESSLA

After advancing position in LA, bt_getnext enters this state. It also enters this state immediately after filling up LA. If LA has become empty, state is set to BT_GSTATE_LADONE. Otherwise, lock request is made on current RID in LA if locking is needed. If lock is not needed or lock was acquired, state becomes BT_GSTATE_LOCKEDRID. Otherwise, the state becomes BT_GSTATE_COULDNOTLOCK.

(c) BT_GSTATE_LADONE

This state is entered when it is found that LA is done. bt_handle_LAdone( ) handles this state. Essentially, its job is to fill LA with RIDs from rows of interest. It calls bt_qualpage( ) to qualify index rows from current scan position onwards and fill LA. If bt_qualpage( ) has put at least one RID in LA, BT_GSTATE_PROCESSLA is entered. If bt_qualpage found that high bound has been exceeded, state becomes BT_GSTATE_ENDSCAN (note that in case of SRs, BT_GSTATE_ENDSCAN is set only after next key lock was obtained). Otherwise, it means current page is done and so BT_GSTATE_PAGEDONE is entered.

(d) BT_GSTATE_COULDNOTLOCK

This state is entered if cond lock request fails and bt_handle_couldnotlock( ) is called to handle it. If SKIP_IFNOLOCK has been specified, the state becomes BT_GSTATE_ADVANCELA i.e., the system just moves on to the next RID in LA. Otherwise, bt_handle_couldnotlock( ) calls bt_savekeynblk( ) to save key if needed, drop the latches and to wait on logical lock. bt_savekeynblk has all the blocking logic and it finally returns one of the following.

(1) BLOCK_PGUNCHANGED

This means blocking was done and page was not found changed after wakeup. It is a committed delete, state becomes BT_GSTATE_ADVANCELA. Otherwise, it becomes BT_GSTATE_LOCKEDRID.

(2) BT_BLOCK_PGCHANGED_PRESAVE

Recall that because of using look ahead list, the conditional lock request could be made without holding latch on index page. In that case, if the scan wants to save the key, it saves from datarow. It is possible that by the time the datapage was latched, the index page has changed and so the key could not be saved from datarow. In that case this code is returned and it means that the system did not block. In this case BT_GSTATE_PGCHANGED_NOWAIT is entered.

(3) BT_BLOCK_PGCHANGED_POSTSAVE

This means the scan saved the key that it wanted to save (if any) and blocked on the lock. After wakeup, the page was found to have changed. BT_GSTATE_RETSTART is entered.

(e) BT_GSTATE_PAGEDONE

This state is entered when the current page is done. bt_handle_pagedone( ) handles this state. If the current page is full of committed deletes, the scan may decide to shrink the page. bt_maybeshrink( ) is called which decides whether to do shrink and calls bt_shrink( ) if it decides to. If shrink was attempted, the state becomes BT_GSTATE_RESTART. Otherwise, bt_nextscanpage( ) is called which retrieves next scan page taking care of scan direction as well as any broken linkages due to corruptions or concurrent split or shrink. Once the next scan page is returned, if it is undergoing split/shrink and there is a need to block on it, bt_savekeynblk( ) is called and next state is set depending upon its return codes (as in the case of BT_GSTATE_COULDNOTLOCK).

(f) BT_GSTATE_LOCKEDRID

This state is entered if locking is not applicable or when lock was obtained successfully. After this point if the RID is a non-qualifying one, it is skipped and otherwise it is the returned. In the ICOPY mode, if the scan is at the first RID in LA, all the key values corresponding to RIDs in LA are copied into shadow buffer before unlatching the page and returning the RID. If the scan is not SR and had to block on lock on first RID, it would have already copied key values into the shadow buffer and so the copying step is skipped. Similarly, in DCOPY mode, if the scan is at the first RID in LA, the key value corresponding to it is copied from index page into scan context. As in the case of ICOPY mode, this step is skipped if it is non-SR and had to block on lock on first RID in LA.

(g) BT_GSTATE_PGCHANGED_NOWAIT

If a page changed but there was no lock wait involved, then this state is entered. bt_handle_pgchanged_nowait( ) handles this state. It just does some initialization that BT_GSTATE_RESTART expects and the state is set to BT_GSTATE_RESTART.

(h) BT_GSTATE_RESTART

This state is entered if restart is needed. bt_handle_reposition( ) is called to handle this state. It analyzes LA to figure out what is the restart RID and what is the restart key value. If there is no restart RID, it means scan needs to start all over again. This can happen for SR scans if scan needs to restart before it locked its first key. In NOCOPY mode, key value may not be available in scan context. In that case it has to be built from datarow. Once it has been figured out what key if any to use to restart, bt_getstartpg( ) is called which calls traversal module to position the scan appropriately.

(i) BT_GSTATE_RETRYNKL

This state is entered when nextkeylock needs retrying. A backward scanning SR needs to do "next key" locking. However this is not symmetrical with FW scanning SR. In the case of FW scanning SR, the "next key" lock is the last lock that is obtained; but for a BWscan, it is the first lock. Consider a BWscan on an index I(x ASC) looking for x>=10 and x<=20. It traverses the tree looking for 20 to start the scan. One traversal has positioned it on 20, it needs to do "next key" locking by looking for the next key in the forward direction. The way this is implemented is that when the BWscan is positioned on 20, it calls bt_nextkeylock( ) which temporarily sets the direction of scan to FW direction and calls bt_getnext( ) to get the next key. That call to bt_getnext( ) is special call because it should not do any repositioning. This is because the module that sets up sargs for repositioning finds that scan direction is FW and it may reposition at 10(note that for a BWscan, low bound is 20 but for FWscan, low bound is 10). So this state BT_GSTATE_RETRYNKL has been introduced. When bt_getnext( ) is called from bt_nextkeylock( ), if there is a need to do repositioning, it sets the state to BT_GSTATE_RETRYNKL and returns NULL. The caller, i.e., bt_nextkeylock again retries the operation by locating 20 and calling bt_getnext( ).

(j) BT_GSTATE_ENDSCAN

This state is entered when scan needs to be terminated because there are no more qualifying rows and next key lock if any has been obtained. The scan releases any latches and returns NULL.

(k) BT_GSTATE_ERROR

This state is entered when scan encounters error like deadlock or lock interrupt. Otherwise, the system just terminates the scan when an error occurs, with the result that this is not much different from BT_GSTATE_ENDSCAN.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

APPENDIX A

How copying modes and LA affect restarts
The notation used is(assume 0 based indexing i.e., LA[0] is the first
RID in LA):
LA[N] @: scan positioned at Nth RID in LA
LA[N] +: scan just returned Nth RID to data layer but data layer found that
index page has changed by the time data page was latched and so it wants
same row again.
LA[N] + +: scan returned N RID in LA to data layer and now data layer is
asking for next row.
Index manager advances its scan position only when data layer calls it with
BT_NEXTROW and not if it calls with BT_CURROW and so scan position is moved
to N+1th RID when state has become, LA[N] + +.
The field rid_lastlock in extended scan context serves as LA[−1] and is
used to store last locked (i.e., locked before we started processing
current batch of LA) RID.
More terminology:
RESTART_AT KEY = <K> means immediately after restart, index manager returns
key <K> if it exists in index and qualifies RESTART_AFTER KEY = <K> means
immediately after restart, index manager returns the next qualifying key
after <K> i.e., key K is not returned even if it is found in the index and
qualifies.
RESTART_AFRESH means there is no restart key i.e., same as beginning the
scan again
Now, let us look into how the restart key(i.e., key value, RID) is
identified in the various cases of restarts.
R1 : ICOPY rnode: LA[N] + +
RESTART_AFTER KEY [32 [0 <Nth key val in shadow buffer, RID=LA[N]>
R1 : DCOPY mode: LA[N]+
if (N= =0)
RESTART_AT KEY [32 [0 <keyval from scan context, RID = LA[0]>
Otherwise
Restart rid is obtained by search backwards in LA for a non-zero RID
starting at position N exclusive. It must be found. Suppose it was found at
position M (DENOTES THE POSITION OF LAST NON-ZERO RID IN LA PRECEDING
CURRENT POSITION. If the
state is LA[N] @ or LA[N] +, current position is N. If the state is LA[N] + +,
current position is N+1)
RESTART_AFTER KEY = <keyval from scan context, RID = LA[M]>
R1 : DCOPY mode: LA[N] + +
RESTART_AFTER KEY = <keyval from scan context, RID = LA[M]>
R1 : NOCOPY mode: LA[N] + +
RESTART_AFTER KEY = <keyval from datarow LA[M], RID = LA[M]>
R2 : non-SR(LA must be empty)
Copy keyval and RID from page at position slot=0, ridnum=0 andmake
btsc_keyptr point to it.
After wake up from lock, it page has changed, RESTART_AT KEY =
<btsc_keyptr>
R2 : SR(LA must be empty)
If slot number of last locked row is available (i.e., btg_slot_lastlock !=
BT_INVALID_SLOTNUM)
copy key value from btg_slot_lastlock and make
btsc_keyptr point to it.
else if last locked row qualified(i.e., bt_qual_lastlock=TRUE)
if NOCOPY mode, NULLify keyval in scan context
(because it is stale key value from some previous restart)
After wakeup from lock request, suppose page has changed.
If scan context has keyval
RESTART_AFTER KEY = <keyval from scancontext,
RID=LA [−1]>
Otherwise,
RESTART_AFTER KEY = <keyval from datarow LA[−1],
RID=LA[−1]>
Note that if LA[−1] is 0.0, RESTART_AFRESH is done.
R3 : ICOPY mode: LA[0]@ : non-SR
copy key values corresponding to all rows in LA into shadow buffer.
After wakeup from lock if page has changed,
RESTART_AT KEY = <0th key val in shadow buffer, RID = LA[0]>
R3 : ICOPY mode: LA[N]@ where N >0 : non-SR
key values are already in shadow buffer. After wakeup from lock, if page
has changed,
RESTART_AT KEY = <Nth key val in shadow buffer, RID = LA[N]>
R3 : DCOPY mode: LA[0]@ : non-SR
copy key value from index page(slot# is in btg_slot_1stRIDLA)
After wakeup from lock, if page has changed,
RESTART_AT KEY = <keyval in scan context, RID=LA[0]>
R3 : DCOPY mode: LA[N]@ where N > 0 : non-SR
Don't copy anything.
After wakeup from lock, if page has changed,
RESTART_AFTER KEY = <keyval in scan context, RID=LA[M]>

APPENDIX A-continued

Note that scan context is guarenteed to have a key val.
R3 : NOCOPY mode: LA[0]@ : non-SR
Same as DCOPY mode.
R3 : NOCOPY mode: LA[N]@ where N > 0 : non-SR
Copy the keyvalue from data row LA[N]. Note that no lock is held on data
row and so if index page changes by the time data page is latched, treat
this case in the same way as R1 NOCOPY LA[N-1] + +.
If keyval was successfully copied from datarow and after getting lock, if
index page has changed, RESTART_AT KEY = <keyval in scan context,
RID=LA[N])
R3 : LA[0]@ : SR
Same as R2 SR case.
R3 : LA[N]@ where N > 0 : SR
Don't copy anything. If NOCOPY mode, nullify key in scan context because it
maybe stale value.
After wakeup from lock, if page has changed, If scan context has keyval
RESTART_AFTER KEY = <keyval from scancontext,
RID=LA [M]>
Otherwise,
RESTART_AFTER KEY = <keyval from datarow LA[-1],
RID=LA [M]>
So this is same as R2 SR case except that LA[M] is being
used instead of LA[-1].

What is claimed is:

1. In a computer system having a processor, a memory, and a storage device said storage device storing a database comprising data rows, each data row being identified by a corresponding row identifier that is used by the system to retrieve the data row, said database including at least one index storing index keys comprising key value/row identifier information for identifying which data rows store particular field values, a method for executing a database query for selecting particular ones of said data rows, the method comprising:

receiving a query for selecting particular data rows; and
satisfying the query, at least in part, by performing a scan of a particular index for determining which data rows qualify the query, including performing subsets of:
initializing a scan loop for examining successive index pages of the particular index, for determining which index keys stored in the particular index qualify the query;
creating a list to save up to a certain number of row identifiers from a given index page that correspond to index keys in the particular index that qualified the query; and
scanning the particular index for determining which data rows qualify the query, including performing substeps of:
(i) while holding a latch on a current index page, locating up to said certain number of index keys on the current index page that qualify the query and storing their associated row identifiers in said list,
(ii) if the current index page is modified by a concurrent transaction upon release of the latch, restarting the scan by looping back to substep (i) with a new index page containing the current index key being located as the current index page, and
(iii) when no more index keys remain to be located on the current index page, looping back to substep (i) for a next index page, if any; and thereafter terminating the scan loop.

2. The method of claim 1, wherein said query comprises a non-covered query.

3. The method of claim 2, wherein said query requires retrieval of data rows in order to satisfy the query.

4. The method of claim 1, wherein said particular index comprises a B+-tree index having index keys, wherein each index key comprises a key value and a row identifier of a corresponding data row.

5. The method of claim 1, wherein said index scan is performed with optional search arguments.

6. The method of claim 1, further comprising:
using the row identifiers retrieved during the index scan to retrieve data rows that qualify the query.

7. The method of claim 1, wherein said row identifiers each comprise a page identifier and a row number for indicating where a corresponding data row is stored in the database.

8. The method of claim 1, wherein said certain number is equal to about 60.

9. The method of claim 1, wherein the database system releases any latch held on an index page during a scan whenever the scan needs to return a row.

10. The method of claim 1, wherein said latch comprises a short-term lock that is held only for the duration of accessing a given page.

11. In a computer system having a processor, a memory, and a storage device, said storage device storing a database comprising data rows, each data row being identified by a corresponding row identifier that is used by the system to retrieve the data row, said database including at least one index storing index keys comprising key value/row identifier information for identifying which data rows store particular field values, an improved method for executing a database query for selecting particular ones of said data rows, said database query capable of being satisfied at least in part by scanning a particular index, the improvement comprising:

creating a look-ahead list for storing a certain number of row identifiers from a given index page that correspond to index keys in the particular index that qualified the database query;
while performing a scan of the particular index for determining which data rows qualify the query, performing substeps of:
(i) while holding a latch on a current index page, locating a certain number of index keys on the current index page that qualify the query;
(ii) for any index keys so located, storing their associated row identifiers in said look-ahead list; and (iii) if the current index page is modified by a concurrent transaction upon release of the latch, restarting the scan by looping back to substep (i) with a new index page containing the current index key being located as the current index page.

12. The improved method of claim 11, wherein a latch is held on the current index page being scanned.

13. The improved method of claim 12, wherein said latch comprises a short-term lock that is held only for the duration that the current index page is accessed.

14. The improved method of claim 11, wherein said scan includes:
examining successive index pages of the particular index, for determining which index keys stored in the particular index qualify the query.

15. The method of claim 11, wherein said query comprises a non-covered query.

16. The method of claim 15, wherein said query requires retrieval of data rows in order to satisfy the query.

17. The method of claim 11, wherein said particular index comprises a B+-tree index having index keys, wherein each index key comprises a key value and a row identifier of a corresponding data row.

18. The method of claim 11, wherein said scan is performed with optional search arguments.

19. The method of claim 11, further comprising:
using the row identifiers retrieved during the scan to retrieve data rows that qualify the query.

20. The method of claim 11, wherein said row identifiers each comprise a page identifier and a row number for indicating where a corresponding data row is stored in the database.

21. The method of claim 11, wherein said look-ahead list stores a maximum number of row identifiers.

22. The method of claim 21, wherein said maximum number comprises about 60 row identifiers.

23. The improved method of claim 11, wherein a latch is held on the current index page being scanned, but is released during a scan whenever the scan needs to return a row.

24. The improved method of claim 11, wherein the scan occurs without copying keys that qualify the query.

25. The improved method of claim 11, wherein the scan occurs without use of a shadow page to store keys that qualify the query.

26. The improved method of claim 11, wherein the scan occurs without performing a latch/unlatch operation each time a qualifying key is located on an index page being scanned.

27. The improved method of claim 11, wherein each row identifier comprises an identifier of about six (6) bytes in size.

28. The improved method of claim 11, further comprising:
encountering a condition that requires the scan to be restarted; and
constructing an index key to restart the scan, based on the data record that corresponds to the last row identifier returned.

* * * * *